(12) United States Patent
Heim et al.

(10) Patent No.: US 8,560,196 B2
(45) Date of Patent: Oct. 15, 2013

(54) MOUNTING DEVICE WITH INTEGRATED TORQUE MEASUREMENT AND DEVICE FOR THE CONTROL OF TORQUE DISTRIBUTION

(75) Inventors: Jens Heim, Bergrheinfeld (DE); Roland Langer, Schwanfeld (DE); Peter Niebling, Bad Kissingen (DE); Christian Mock, Schweinfurt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1131 days.

(21) Appl. No.: 12/304,010

(22) PCT Filed: Jun. 5, 2007

(86) PCT No.: PCT/DE2007/001004
§ 371 (c)(1),
(2), (4) Date: May 12, 2009

(87) PCT Pub. No.: WO2007/140762
PCT Pub. Date: Dec. 13, 2007

(65) Prior Publication Data
US 2011/0264345 A1    Oct. 27, 2011

(30) Foreign Application Priority Data
Jun. 10, 2006 (DE) .......................... 10 2006 027 090

(51) Int. Cl.
*G06F 17/00* (2006.01)
*G06F 19/00* (2011.01)
*G01P 3/44* (2006.01)
*G01M 13/00* (2006.01)

(52) U.S. Cl.
USPC ................................ 701/70; 701/93; 340/441

(58) Field of Classification Search
USPC ................ 701/1, 29, 31, 34–36, 69, 70, 29.1, 701/29.2, 51, 71, 93; 340/425.5, 429, 438, 340/439, 441
See application file for complete search history.

(56) References Cited

U.S. PATENT DOCUMENTS

| | | | | |
|---|---|---|---|---|
| 5,585,572 A | * | 12/1996 | Kindler | .................... 73/862.338 |
| 5,762,559 A | * | 6/1998 | Jacob et al. | .................... 464/145 |
| 6,088,637 A | * | 7/2000 | Acker et al. | .................... 701/38 |
| 2006/0045400 A1 | | 3/2006 | Yamamoto | |

FOREIGN PATENT DOCUMENTS

| | | |
|---|---|---|
| DE | 36 36 243 | 5/1988 |
| DE | 199 19 031 A | 11/2000 |
| EP | 1 550 813 | 7/2005 |
| JP | 08 200384 | 8/1996 |
| WO | 02/08048 | 1/2002 |
| WO | 03/019126 A | 3/2003 |
| WO | 2005/003709 | 1/2005 |

* cited by examiner

*Primary Examiner* — Thomas Tarcza
*Assistant Examiner* — Edward Pipala
(74) *Attorney, Agent, or Firm* — Lucas & Mercanti, LLP

(57) ABSTRACT

A mounting device for mounting a driven and/or a drivable wheel of a vehicle. The mounting device makes it possible to measure a drive torque or a drag torque that acts between a wheel and a driveshaft. The torque is transmitted from the driveshaft to the wheel by radial teeth on a bearing inner ring where there is a pressure-sensitive measuring element to measure axial forces as a characteristic of the particular effective torque. In addition, a device to control the distribution of the drive and drag torques acting on the driveable wheels of a vehicle is disclosed. To measure the drive and drag torque distribution, there is a sensor unit on each drivable wheel to measure the torque acting on each wheel.

18 Claims, 2 Drawing Sheets

MOUNTING DEVICE WITH INTEGRATED TORQUE MEASUREMENT AND DEVICE FOR THE CONTROL OF TORQUE DISTRIBUTION

This application is a 371 of PCT/DE2007/001004 filed Jun. 5, 2007, which in turn claims the priority of DE 10 2006 027 090.8 filed Jun. 10, 2006, the priority of both applications is hereby claimed and both applications are incorporated by reference herein.

FIELD OF THE INVENTION

The invention relates to a bearing arrangement for mounting a driven or drivable wheel of a vehicle. The bearing arrangement according to the invention enables the measurement of the torque which acts between the wheel and a driveshaft. The invention also relates to a device for regulating the distribution of the drive and drag forces acting on the drivable wheels of a vehicle.

Motor vehicles in which in particular all four wheels are driven are increasingly fitted with a controller for drive torque distribution, as a result of which improved vehicle lateral dynamics are obtained, with a simultaneous increase in driving safety. The control of the drive torque distribution requires suitable measuring devices in order to be able to determine the respective driving situation.

BACKGROUND OF THE INVENTION

DE 41 12 904 A1 describes a drive torque distribution control device for vehicles, which device has a clutch for varying the torque distribution between first and second drive wheels. The clutch is controlled by means of a control signal which is determined on the basis of the measurement values of an acceleration position sensor and of a lateral acceleration sensor. A disadvantage of said solution is the limited accuracy with which the respective driving situation can be determined. The torques actually acting on the wheels are not determined in said solution.

Various further solutions for measuring other variables are known, each with the aim of determining the torque distribution.

In this connection, DE 689 28 004 T2 describes an arrangement for controlling the force transmission of a four-wheel drive vehicle, in which the variation of the drive torque distribution is selected inter alia also as a function of the present steer angle, the throttle pedal position, the engine power and the braking force.

In DE 40 31 890 A1, it is proposed that the difference in the rotational speeds of the front and rear wheels be determined. It is known from DE 41 33 060 A1 to additionally determine the wind yaw moment generated by side wind. All of said solutions have in common that the determination of the torque distribution takes place only indirectly, such that the level of accuracy which is obtained is unsatisfactory in many driving situations.

From DE 195 14 093 B4, it is known to determine the torsion in the wheel drive axles of a vehicle by means of speed sensors at the wheel driveshafts. For this purpose, it is necessary to determine further characteristic variables such as the rotational speed of the drive unit and the degree of throttle flap opening. An advantage of said solution is the measurement of characteristic variables directly at the driveshafts. In turn, a disadvantage is the indirectness of the determination of the torques acting in the driveshafts, as a result of which only a limited degree of accuracy is possible.

DE 103 38 172 B3 describes a wheel-hub/revolute-joint arrangement as is commonly used, in this embodiment or in similar embodiments, for mounting drivable wheels of motor vehicles. In said solutions, a journal on a revolute joint of a driveshaft has an external toothing which engages into an internal toothing of a wheel hub, as a result of which the drive torque can be transmitted. The wheel hub is mounted in the region of the engaging journal in a double-row ball bearing of a wheel carrier. An alternative solution to the wheel bearing is known from DE 36 04 630 C2, in which the transmission of the drive torque from the revolute joint of the driveshaft to the wheel hub takes place via a spur toothing. The wheel hub simultaneously forms the bearing inner ring of the double-row ball bearing for mounting the wheel. For the stated solutions for mounting a wheel which is driven via a revolute joint, no solution is known for determining the torque acting on the wheel.

SUMMARY OF THE INVENTION

It is therefore an object of the present invention to provide a bearing arrangement for mounting a drivable wheel of a vehicle, which bearing arrangement permits a direct measurement of the torque acting between the wheel and the driveshaft. The overriding object of the invention can be considered that of providing an improved arrangement for regulating the drive torque distribution of the drivable wheels of a vehicle, by means of which arrangement a more precise determination of the respective driving situation is possible.

The object is achieved by means of a bearing arrangement in which the transmission of drive and drag torques between a wheel and a driveshaft takes place via a spur toothing on a bearing inner ring.

A pressure-sensitive measuring element is arranged axially adjacent to the spur toothing and is sensitive to axial forces which occur there. It is possible by means of said measuring element to determine an axially acting force which is directly proportional to the acting torque, since the acting torque is partially converted, at oblique teeth of the spur toothing, into an axially acting force component.

In a generalized sense, the object is achieved by means of an arrangement for regulating drive and drag torques of drivable wheels of a vehicle. Here, to measure the drive and drag torque distribution, in each case one sensor unit is arranged at the drivable wheels for measuring the torque acting on the respective wheel.

An important advantage of the bearing arrangement according to the invention is that only few design modifications are necessary in relation to conventional bearing arrangements. The existing production technology need be expanded merely for the assembly of the measuring element and of the sensor.

The pressure-sensitive measuring element is preferably arranged on the bearing inner ring.

Here, it is also possible for the bearing inner ring to have a recess which runs at least in sections axially adjacent to the spur toothing in the bearing inner ring, in which recess of the bearing inner ring the pressure-sensitive measuring element is arranged. It may particularly preferably be provided that the recess is embodied as a groove which is arranged in an encircling fashion in the bearing inner ring.

The groove is also preferably arranged axially directly adjacent to the spur toothing in the bearing inner ring, that is to say the bearing inner ring has an axial length between the base surface of the toothing and the groove, which axial length is necessary specifically such that the spur toothing can absorb the occurring loadings. In said embodiment, the axial force which is generated by the torque acting on the spur toothing is transmitted substantially to the pressure-sensitive measuring element, such that a precise measurement is possible.

It is also alternatively possible for a contact surface or the like to be provided—in a corresponding position—on the bearing inner ring on which the pressure-sensitive measuring element is arranged.

The measuring element may be formed by a measuring ring, the material of which has a pronounced inverse magnetostrictive effect or magnetoelastic effect. The shape change caused by the introduction of force generates a change in the magnetic field, which change can be determined by means of one or more suitable sensors. The sensor(s) is/are fastened to the bearing outer ring or to the wheel carrier and are situated in the varying magnetic field of the measuring ring. In particular, said sensor(s) is/are situated opposite the pressure-sensitive measuring element, for example arranged in the recess of the bearing inner ring.

The sensor is preferably arranged on the bearing outer ring at a position which is situated within a tilt axis which results from a wheel side force. In this way, the lateral influence from the wheel side force is minimized, and the measurement accuracy is increased.

In said embodiment, it is also possible for a second sensor to be arranged on the bearing outer ring, with the second sensor likewise being situated in the stated tilt axis and being situated opposite the first sensor on the periphery of the bearing outer ring.

In modified embodiments, the measuring element may also be formed by other pressure-sensitive materials or sensor elements or else by a pressure-sensitive coating on a measuring element carrier, which are read out by means of the sensor(s) on the bearing outer ring.

The annular measuring element is preferably divided into segments which are read out cyclically or simultaneously. In the case of a simultaneous read-out of the individual segments, the measurement values may be added up with a weighting according to the position of the sensors in order to minimize a lateral influence of a wheel side force. In the case of a different weighting for the addition, it is possible to determine the tilting moment, such that, for a known tire radius, it is possible to derive the wheel side force.

The bearing arrangement according to the invention is preferably embodied as a double-row ball bearing, with the bearing inner ring being formed by a projection on the hub of the wheel. Such an embodiment permits a low-friction bearing arrangement, a compact design and a reliable transmission of large torques.

An important advantage of the device for regulating the drive torques of drivable wheels of a vehicle is that the influencing of the torque distribution takes place as a function of the torques actually occurring at the individual wheels. There is no requirement for measurement values for acceleration components, steer angles or the like, by means of which it has hitherto been possible only to estimate the required influencing of the torque distribution. With the bearing arrangement according to the invention, it is now possible to determine the torque actually acting on the wheel, and to use said values for the regulation according to the invention.

BRIEF DESCRIPTION OF THE DRAWINGS

Further advantages, details and refinements of the invention can be gathered from the following description of a plurality of embodiments with reference to the drawings, in which.

DETAILED DESCRIPTION OF THE INVENTION

Figure 1:
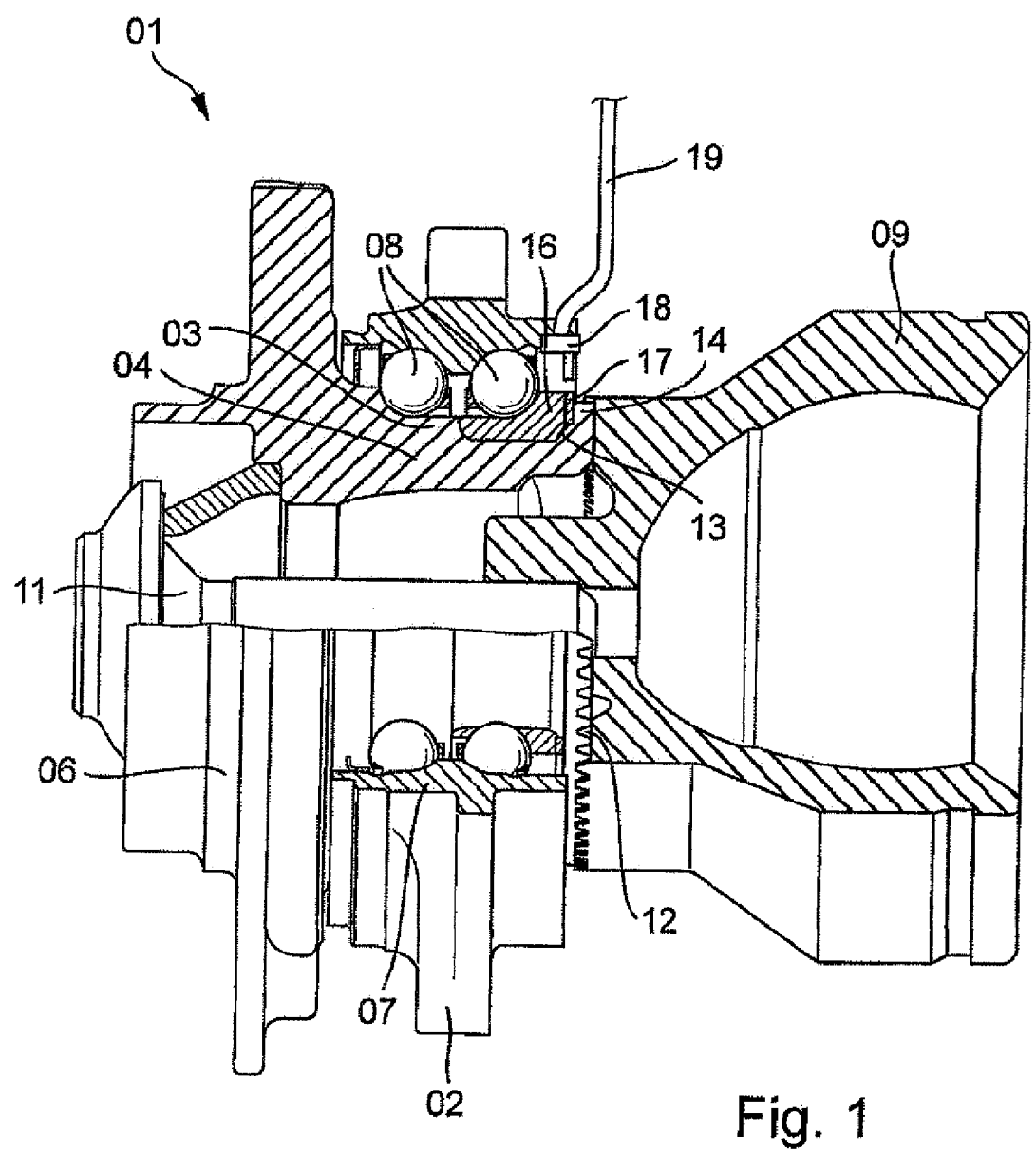
FIG. 1 shows a side view of a preferred embodiment of a bearing arrangement according to the invention.
Figure 2:
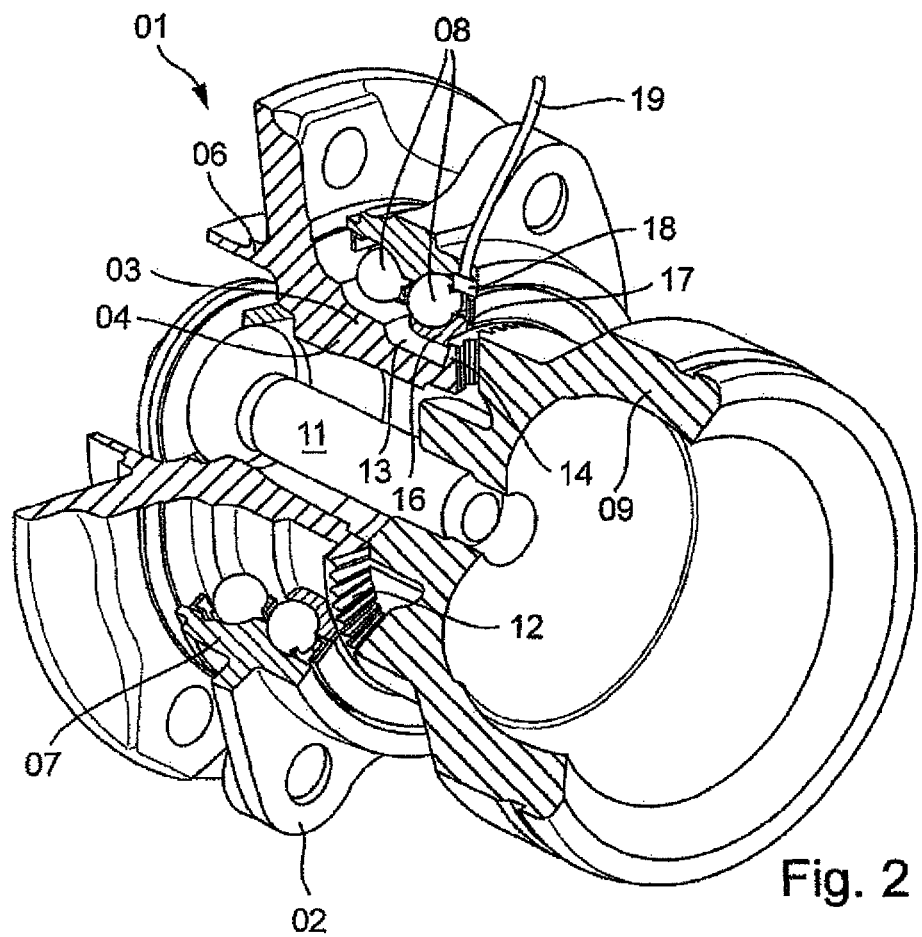
FIG. 2 shows a perspective view of the bearing arrangement shown in FIG. 1.

FIG. 1 shows a partially sectioned side view and FIG. 2 shows a perspective view of a bearing arrangement 01 for mounting a drivable wheel on a wheel carrier 02 of a vehicle. The bearing arrangement 01 comprises a bearing inner ring 03 which is formed by a projection 04 on a hub 06 of the wheel. A bearing outer ring 07 is formed in the wheel carrier 02. The bearing inner ring and the bearing outer ring may also be formed as separate parts which are fixedly connected to the wheel hub 06 or to the wheel carrier 02 respectively. The bearing arrangement 01 is embodied here as a double-row ball bearing in which balls 08 function as rolling bodies. The bearing arrangement according to the invention may however also be embodied as any desired type of rolling bearing or else as a plain bearing.

The wheel hub 06 is fastened to a revolute joint 09. The revolute joint 09 is connected to a driveshaft (not shown) and transmits torques from the driveshaft to the wheel hub 06. The wheel hub 06 is connected to the revolute joint 09 by means of a screw 11. Said connection generates an axial pressing force of the wheel hub 06 against the revolute joint 09. Said connection alone is however not sufficient to transmit the occurring torques. For this purpose, the end-side contact surfaces between the wheel hub 06 and the revolute joint 09 each have a spur toothing 12. The spur toothing 12 permits a reliable transmission of the occurring torques between the wheel hub 06 and the revolute joint 09. At the same time, said type of connection permits fast assembly and disassembly of the wheel hub 06.

The bearing inner ring 03 has, axially adjacent to the spur toothing 12, a recess in the form of an encircling groove 13. In this way, the bearing inner ring 03 has a material weakening in the region between the groove 13 and the spur toothing 12 and is embodied as a collar 14. The collar 14 has an axial length of only a few millimeters, with said length decreasing with increasing radius. The axial length of the collar 14 is dimensioned such that the latter can absorb the forces acting on the spur toothing 12. Under the forces which occur during operation, therefore, plastic deformation of the collar 14 does not occur. At the same time, the axial length of the collar 14 is dimensioned such that forces acting axially on the spur toothing 12 in the direction of the wheel hub 06 generate an elastic deformation at the free end of the collar and also act, to a high degree, up to the groove 13. Situated in the groove 13 is a measuring element carrier 16 with a measuring element 17. The measuring element carrier 16 fills the groove 13 almost entirely and is composed of a hard material. Said measuring element carrier 16 also functions as a raceway of the bearing inner ring 03 for one of the two rows of balls 08. The measuring element 17 is arranged without play between the measuring element carrier 16 and the collar 14. As a result of the play-free arrangement of the measuring element 17 with respect to the hard measuring element carrier 16, it is ensured that a force which acts axially on the collar 14 in the direction of the wheel hub 06 acts to a high degree on the measuring element 17. Since the measuring element carrier 16 simultaneously functions as a raceway for the balls 08, a force which acts axially in the direction of the wheel hub 06 on the collar 14 is transmitted directly from the measuring element carrier 16 to the balls 08, such that the force can be absorbed only slightly by the projection 04 of the wheel hub 06. Said structural design also ensures that the axially acting force acts to a high degree on the measuring element 17.

The measuring element 17 has an annular shape corresponding to the groove 13 and is composed of a material which has a pronounced inverse magnetostrictive effect. If a force acts on the measuring element 17, then the magnetic field of the measuring element 17 changes on account of the inverse magnetostrictive effect.

The varying magnetic field of the measuring element 17 is measured by means of a sensor 18. The sensor 18 is fastened to the bearing outer ring 07 and is situated opposite the measuring element 17. There is a gap of a few millimeters between the sensor 18 and the measuring element 17. The sensor 18 is a magnetoresistive sensor, such as for example an MR, AMR, TMR, CMR or GMI sensor. It is however possible to use any sensor type with which it is possible to measure the occurring change in the magnetic field; for example also a sensor by means of which the induced voltage is measured. The sensor 18 is connected by means of a connecting line 19 to evaluating electronics (not shown).

By means of the bearing arrangement 01, it is possible to determine a torque which acts on the driveshaft, the revolute joint 09, the wheel hub 06 and the wheel. It is possible to determine both drive torques and also drag torques. Both types of torque have the effect that the torque occurring at the spur toothing 12 is converted partially into an axially acting force which is proportional to the torque and which acts on the measuring element 17. Said action is measured by means of the sensor 18 and is signaled to the evaluating electronics.

The vehicle preferably comprises three further drivable wheels whose bearing units are formed in the same way as the bearing unit 01 which is shown. The evaluating electronics receive the signals of the sensors of all four bearing units. In this way, it is possible for the torque distribution of the wheels of the vehicle to be determined at all times. The vehicle also has a device for controlling the torque distribution. Control devices of said type have an influence inter alia on the torque of a drive device, on the settings of differential gearings, on clutches between the driveshafts and on individual wheel brakes. Since the torque distribution is measured permanently by means of the evaluating electronics, it is possible to construct a regulating circuit for regulating the drive and drag torques of the wheels of the vehicle. Said regulating circuit permits a precise adaptation of the torque distribution to the given driving situation.

In the embodiment shown, a sensor unit is formed by the measuring element 17 and the sensor 18. The sensor unit of a device according to the invention for regulating the torque distribution may also be formed by other arrangements for determining the torque acting on the respective wheel.

Figure 3:
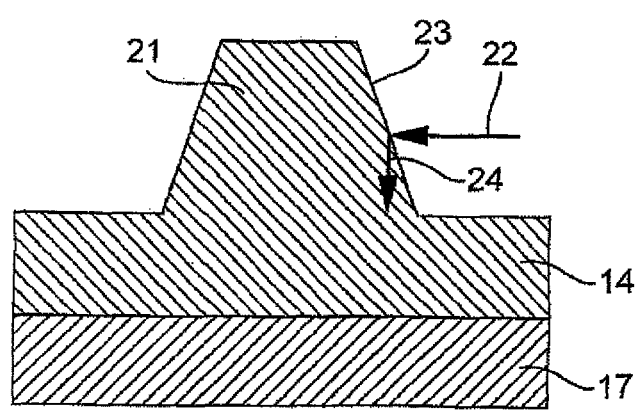
FIG. 3 shows a detailed view of a bearing arrangement shown in FIGS. 1 and 2.

FIG. 3 shows a detailed view of the bearing arrangement shown in FIGS. 1 and 2. Said Figure illustrates in particular a tooth 21 of the spur toothing on the collar 14, and the measuring element 17. The illustration shows that the design of the collar 14 enables an axially acting force to be transmitted to the measuring element 17, since the collar 14 has a correspondingly small material thickness. An arrow 22 denotes a torque which acts between the wheel and the driveshaft and which acts as a laterally acting force on the tooth 21. On account of the oblique design of the tooth 21 at its flanks 23, the torque 22 results in an axially acting force component which is denoted by the arrow 24. The ratio between the laterally acting force of the torque 23 and the axially acting force 24 is determined by the angle of inclination of the flanks 23.

LIST OF REFERENCE SYMBOLS

01 Bearing arrangement
02 Wheel carrier
03 Bearing inner ring
04 Projection on the wheel hub
05 -
06 Wheel hub
07 Bearing outer ring
08 Balls
09 Revolute joint
10 -
11 Screw
12 Spur toothing
13 Groove
14 Collar
15 -
16 Measuring element carrier
17 Measuring element
18 Sensor
19 Connecting line
20 -
21 Tooth
22 Torque
23 Oblique flank
24 Axial force

The invention claimed is:

1. A bearing arrangement for mounting a drivable wheel on a wheel carrier of a vehicle, comprising:
   a bearing inner ring, which is rotationally fixedly connected to the wheel, having a recess and a spur toothing with tooth flanks that are oblique with respect to an axial direction to transmit torque, the bearing inner ring can be coupled by the spur toothing to a driveshaft;
   a bearing outer ring which is rotationally fixedly connected to the wheel carrier;
   a pressure-sensitive measuring element which is arranged axially adjacent to the spur toothing and which is sensitive to axial forces which occur there; and
   at least one sensor for determining the force acting on the measuring element,
   wherein the measuring element is arranged on the bearing inner ring and in the recess of the bearing inner ring.

2. The bearing arrangement as claimed in claim 1, wherein the recess runs at least in sections axially adjacent to the spur toothing in the bearing inner ring.

3. The bearing arrangement as claimed claim 1, wherein the recess is embodied as a groove which is arranged in an encircling fashion in the bearing inner ring and axially directly adjacent to the spur toothing.

4. The bearing arrangement as claimed in claim 1, wherein the sensor is arranged on the bearing outer ring and is situated opposite the pressure-sensitive measuring element.

5. The bearing arrangement as claimed in claim 1, wherein the sensor is arranged on the bearing outer ring and is situated opposite the recess of the bearing inner ring.

6. The bearing arrangement as claimed in claim 1, wherein rolling bodies are arranged between the bearing inner ring and the bearing outer ring in order, together, to form a rolling bearing.

7. The bearing arrangement as claimed in claim 1, wherein the rolling bearing is designed as a double-row ball bearing.

8. The bearing arrangement as claimed in claim 1, wherein the bearing inner ring is embodied as a projection on a hub of the wheel.

9. The bearing arrangement as claimed in claim 1, further comprising a measuring element carrier is also arranged on the bearing inner ring, in the recess of the bearing inner ring, the measuring element being arranged axially adjacent to the measuring element carrier, between the measuring element carrier and the spur toothing.

10. The bearing arrangement as claimed in claim 9, wherein the measuring element carrier simultaneously forms a raceway for the rolling bodies.

11. The bearing arrangement as claimed in claim 1, wherein the measuring element is formed by a measuring ring which has an inverse magnetostrictive effect.

12. The bearing arrangement as claimed in claim 1, wherein the measuring element is formed by a measuring ring which has a magnetoelastic effect.

13. The bearing arrangement as claimed in claim 1, wherein the measuring element is formed by a pressure-sensitive coating on the measuring element carrier.

14. The bearing arrangement as claimed in claim 1, wherein the measuring element is formed by a measuring ring with pressure-sensitive sensor elements whose measurement signal is read out by means of the sensor.

15. The bearing arrangement as claimed in claim 1, wherein the measuring ring is divided into a plurality of segments.

16. The bearing arrangement as claimed in claim 1, wherein sensor is provided in single or double form and is situated in a tilt axis which results from a wheel side force.

17. The bearing arrangement as claimed in claim 1, wherein sensor is provided in multiple form and the sensors are distributed over the periphery of the bearing outer ring.

18. An arrangement for regulating the distribution of drive and drag torques of drivable wheels of a vehicle, comprising:
  means for controlling the drive and drag torques of the drivable wheels; and
  means for measuring the drive and drag torque distribution, which means have, at each drivable wheel, in each case one sensor unit for measuring the torque acting on the wheel,
  wherein the means for measuring the drive torque and the drag torque distribution are integrated in a bearing arrangement according to claim 1.

* * * * *

UNITED STATES PATENT AND TRADEMARK OFFICE
CERTIFICATE OF CORRECTION

PATENT NO. : 8,560,196 B2
APPLICATION NO. : 12/304010
DATED : October 15, 2013
INVENTOR(S) : Heim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1283 days.

Signed and Sealed this
Fifteenth Day of September, 2015

Michelle K. Lee
*Director of the United States Patent and Trademark Office*